US012718506B2

(12) United States Patent
Naruka et al.

(10) Patent No.: US 12,718,506 B2
(45) Date of Patent: Aug. 25, 2026

(54) SYSTEMS AND METHODS FOR GENERATING AN INTERACTIVE 3D ENVIRONMENT USING SPATIAL COMPUTING TO GENERATE HISTORICAL DIGITAL COMPONENTS

(71) Applicant: BANK OF AMERICA CORPORATION, Charlotte, NC (US)

(72) Inventors: Chetan Singh Naruka, Gurugram (IN); Suresh P. Jolhapuram, Mumbai (IN); Abirami V B, Tiruchirappalli (IN); Shailendra Singh, Thane West (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 203 days.

(21) Appl. No.: 18/504,830

(22) Filed: Nov. 8, 2023

(65) Prior Publication Data

US 2025/0148733 A1 May 8, 2025

(51) Int. Cl.
*G06T 19/20* (2011.01)
*G06T 19/00* (2011.01)

(52) U.S. Cl.
CPC ............ *G06T 19/20* (2013.01); *G06T 19/006* (2013.01); *G06T 2219/2016* (2013.01); *G06T 2219/2024* (2013.01)

(58) Field of Classification Search
CPC ..... G06T 13/40; G06T 19/003; G06T 19/006; G06T 19/20
See application file for complete search history.

(56) References Cited

U.S. PATENT DOCUMENTS 6,421,047 B1 7/2002 de Groot
6,570,563 B1 5/2003 Honda
6,981,040 B1 12/2005 Konig
8,113,959 B2 2/2012 de Judicibus
8,159,519 B2 4/2012 Kurtz
8,458,603 B2 6/2013 Finn
(Continued)

OTHER PUBLICATIONS

Ge et al., Long Video Generation with Time-Agnostic VQGAN and Time-Sensitive Transformer, arXiv, Sep. 2022 (Year: 2022).*

*Primary Examiner* — Charles Tseng
(74) *Attorney, Agent, or Firm* — Moore & Van Allen PLLC; Lauren M. Stokes

(57) ABSTRACT

Systems, computer program products, and methods are described herein for generating an interactive 3D environment using spatial computing to generate historical digital components. The present invention is configured to identify a user account(s), wherein the user account(s) is associated with a resource account(s); identify a resource transmission(s) associated with the resource account(s), wherein the resource transmission(s) is associated with a geolocation coordinate(s) or an entity identifier(s); generate a virtual computing environment based on the at least one resource transmission and geolocation coordinate(s) or the entity identifier(s); generate a virtual computing environment avatar based on the user account, the resource transmission(s) and the geolocation coordinate(s) or the entity identifier(s); and generate a resource transmission movie in the virtual computing environment, wherein the resource transmission movie comprises at least one virtual computing environment component based on the resource transmission(s).

20 Claims, 7 Drawing Sheets

(56) References Cited

U.S. PATENT DOCUMENTS 8,890,812 B2 11/2014 Billerbeck
9,235,319 B2 1/2016 Finn
9,429,752 B2 8/2016 Schowengerdt
9,779,512 B2 10/2017 Tomlin
9,865,089 B2 1/2018 Burns
10,190,791 B2 1/2019 Jacobson
10,242,032 B2 3/2019 Sundaresan
10,509,533 B2 12/2019 Grasset
10,585,575 B2 3/2020 Kindelsberger
10,949,672 B1 3/2021 Tang
11,282,139 B1 3/2022 Winklevoss
11,315,328 B2 4/2022 Aksoy
11,481,288 B2 10/2022 Haramati
11,538,213 B2 12/2022 Rowley
11,580,697 B2 2/2023 Venshtain
11,734,366 B2 8/2023 Kimchi
11,779,213 B2 10/2023 Tran
11,792,485 B2 10/2023 Felman
2002/0024532 A1 2/2002 Fables
2002/0056091 A1 5/2002 Bala
2002/0113809 A1 8/2002 Akazawa
2003/0043144 A1 3/2003 Pundarika
2005/0143174 A1* 6/2005 Goldman .............. A63F 13/822
463/40
2006/0259473 A1 11/2006 Li
2007/0210937 A1 9/2007 Smith
2007/0218987 A1 9/2007 Van Luchene
2007/0220174 A1 9/2007 Abhyanker
2009/0170604 A1 7/2009 Mueller
2010/0241998 A1 9/2010 Latta
2013/0044912 A1 2/2013 Kulkarni
2014/0044344 A1 2/2014 Bell
2015/0304806 A1 10/2015 Vincent
2015/0379046 A1* 12/2015 Sundaresan ......... G06F 16/5854
707/772
2016/0284125 A1 9/2016 Bostick
2019/0107990 A1* 4/2019 Spivack .................. G06T 11/60
2019/0295327 A1* 9/2019 An ........................ G06T 19/006
2020/0286161 A1 9/2020 Marguello
2020/0394696 A1* 12/2020 Lopez ................... H04W 4/021
2023/0152122 A1* 5/2023 Volkerink .......... G01C 21/3811
701/426
2023/0259948 A1 8/2023 Paulson
2024/0233443 A1* 7/2024 Rush ...................... G06V 40/23

* cited by examiner

IDENTIFY AT LEAST ONE USER ACCOUNT, WHEREIN THE AT LEAST ONE USER ACCOUNT IS ASSOCIATED WITH AT LEAST ONE RESOURCE ACCOUNT
302

IDENTIFY AT LEAST ONE RESOURCE TRANSMISSION ASSOCIATED WITH THE AT LEAST ONE RESOURCE ACCOUNT, WHEREIN THE AT LEAST ONE RESOURCE TRANSMISSION IS ASSOCIATED WITH AT LEAST ONE GEOLOCATION COORDINATE OR AT LEAST ONE ENTITY IDENTIFIER
304

GENERATE A VIRTUAL COMPUTING ENVIRONMENT BASED ON THE AT LEAST ONE RESOURCE TRANSMISSION AND AT LEAST ONE OF THE AT LEAST ONE GEOLOCATION COORDINATE OR THE AT LEAST ONE ENTITY IDENTIFIER
306

GENERATE A VIRTUAL COMPUTING ENVIRONMENT AVATAR BASED ON THE USER ACCOUNT, THE AT LEAST ONE RESOURCE TRANSMISSION AND AT LEAST ONE OF THE AT LEAST ONE GEOLOCATION COORDINATE OR THE AT LEAST ONE ENTITY IDENTIFIER
308

GENERATE A RESOURCE TRANSMISSION MOVIE IN THE VIRTUAL COMPUTING ENVIRONMENT, WHEREIN THE RESOURCE TRANSMISSION MOVIE COMPRISES AT LEAST ONE VIRTUAL COMPUTING ENVIRONMENT COMPONENT BASED ON THE AT LEAST ONE RESOURCE TRANSMISSION
310

FIGURE 3

SYSTEMS AND METHODS FOR GENERATING AN INTERACTIVE 3D ENVIRONMENT USING SPATIAL COMPUTING TO GENERATE HISTORICAL DIGITAL COMPONENTS

FIELD OF THE INVENTION

The present invention embraces a system for generating an interactive 3D environment using spatial computing to generate historical digital components.

BACKGROUND

In today's world, where visual data and digital multimedia has taken over the presentation of information to users across the world, there exists a great need to present non-uniform data in a clear, concise, and easy-to-use manner, whereby a user can quickly and easily determine whether the data presented is accurate and true. This problem is especially exacerbated when a user has difficulties remembering real-world locations that the user may have visited which is associated with certain data that needs to be presented and validated by the user. Thus, there exists a need for a system that can efficiently, accurately, and dynamically generate and present a 3D environment to a user to generate historical digital components that can mimic real-world historical events.

Applicant has identified a number of deficiencies and problems associated with determining and validating historical events. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for generating an interactive 3D environment using spatial computing to generate historical digital components is provided. In some embodiments, the system may comprise a memory device with computer-readable program code stored thereon; at least one processing device, wherein executing the computer-readable code is configured to cause the at least one processing device to perform the following operations: identify at least one user account, wherein the at least one user account is associated with at least one resource account; identify at least one resource transmission associated with the at least one resource account, wherein the at least one resource transmission is associated with at least one geolocation coordinate or at least one entity identifier; generate a virtual computing environment based on the at least one resource transmission and at least one of the at least one geolocation coordinate or the at least one entity identifier; generate a virtual computing environment avatar based on the user account, the at least one resource transmission and at least one of the at least one geolocation coordinate or the at least one entity identifier; and generate a resource transmission movie in the virtual computing environment, wherein the resource transmission movie comprises at least one virtual computing environment component based on the at least one resource transmission.

In some embodiments, the virtual computing environment avatar dynamically changes based on the at least one resource transmission for each of the at least one geolocation coordinate. In some embodiments, the virtual computing environment avatar dynamically changes comprises a dynamic change to a size of the virtual computing environment avatar or a clothing component of the virtual computing environment avatar.

In some embodiments, the at least one resource transmission is from a resource transmission database, and wherein the at least one resource transmission is organized by a user account identifier.

In some embodiments, the resource transmission movie is generated by a movie transformer AI engine, and wherein the movie transformer AI engine comprises a large video map model (LVMM). In some embodiments, the LVMM is pre-trained on a plurality of videos, a plurality of images, a plurality of visual effects, a plurality geographical coordinates, and a plurality of images or videos associated with each geographical coordinate of the plurality of geographical coordinates. In some embodiments, the LVMM consolidates a plurality of related images into at least one frame associated with the at least one geolocation coordinate, and where a plurality of frames is merged to generate the resource transmission movie.

In some embodiments, the resource transformer movie comprises at least one of a current resource transmission suggestion component overlayed in the virtual computing environment associated with the at least one geolocation coordinate or the entity identifier.

In some embodiments, the resource transformer movie comprises an over layment of an at least one digital component over a real-world environment, wherein the at least one digital component comprises the virtual computing environment.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
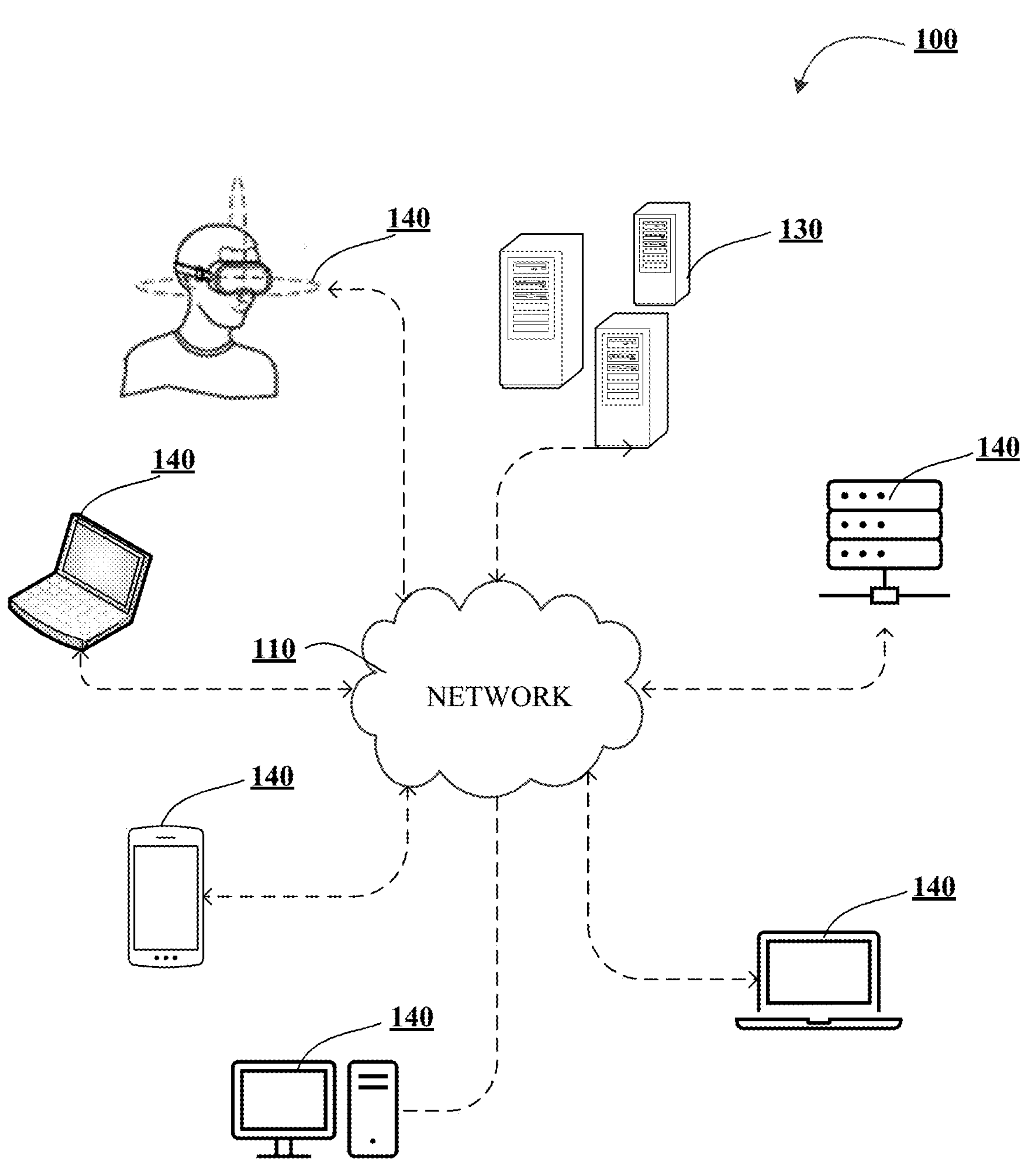
Figure 1B:
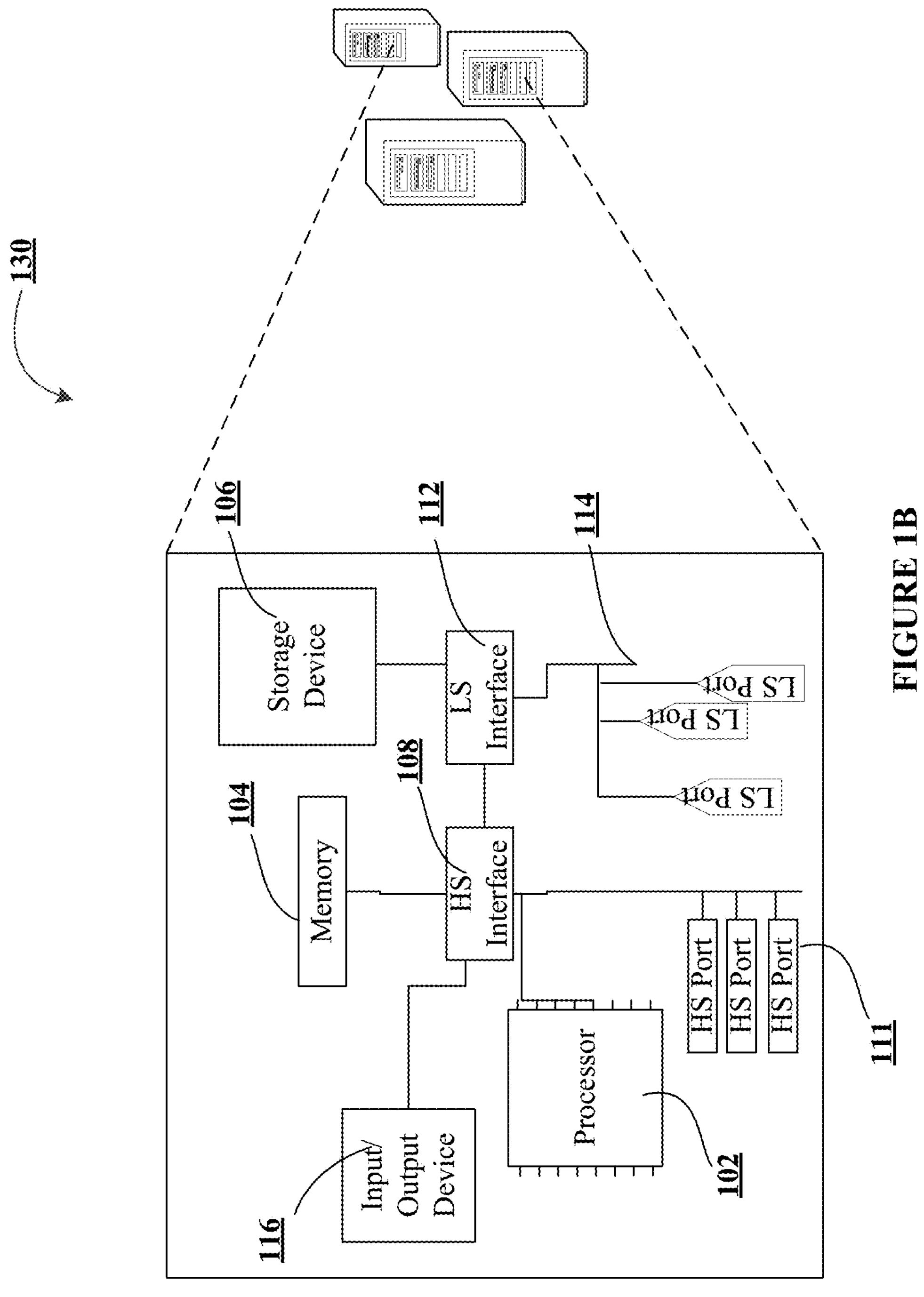
Figure 1C:
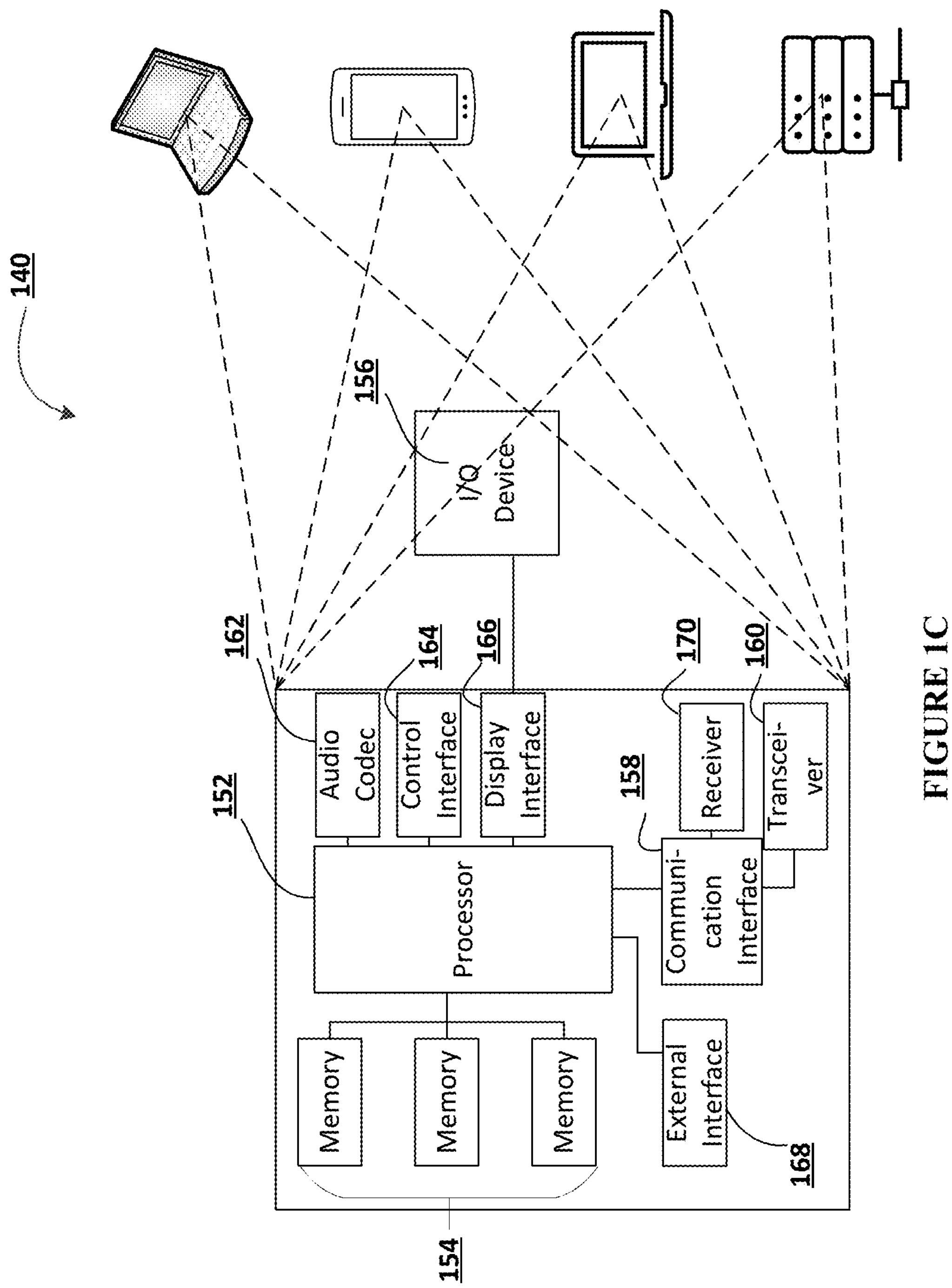
Figure 2:
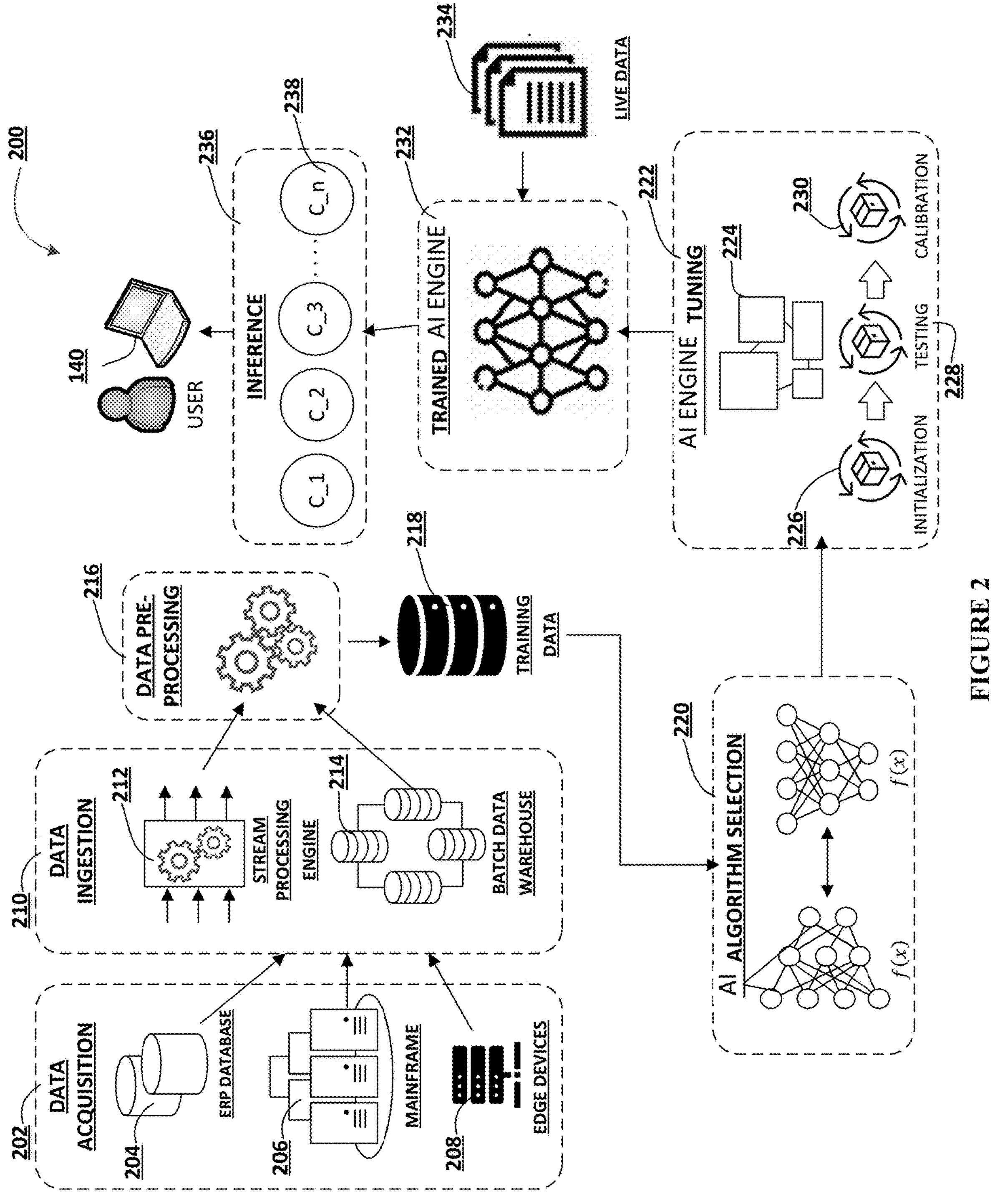
Figure 4:
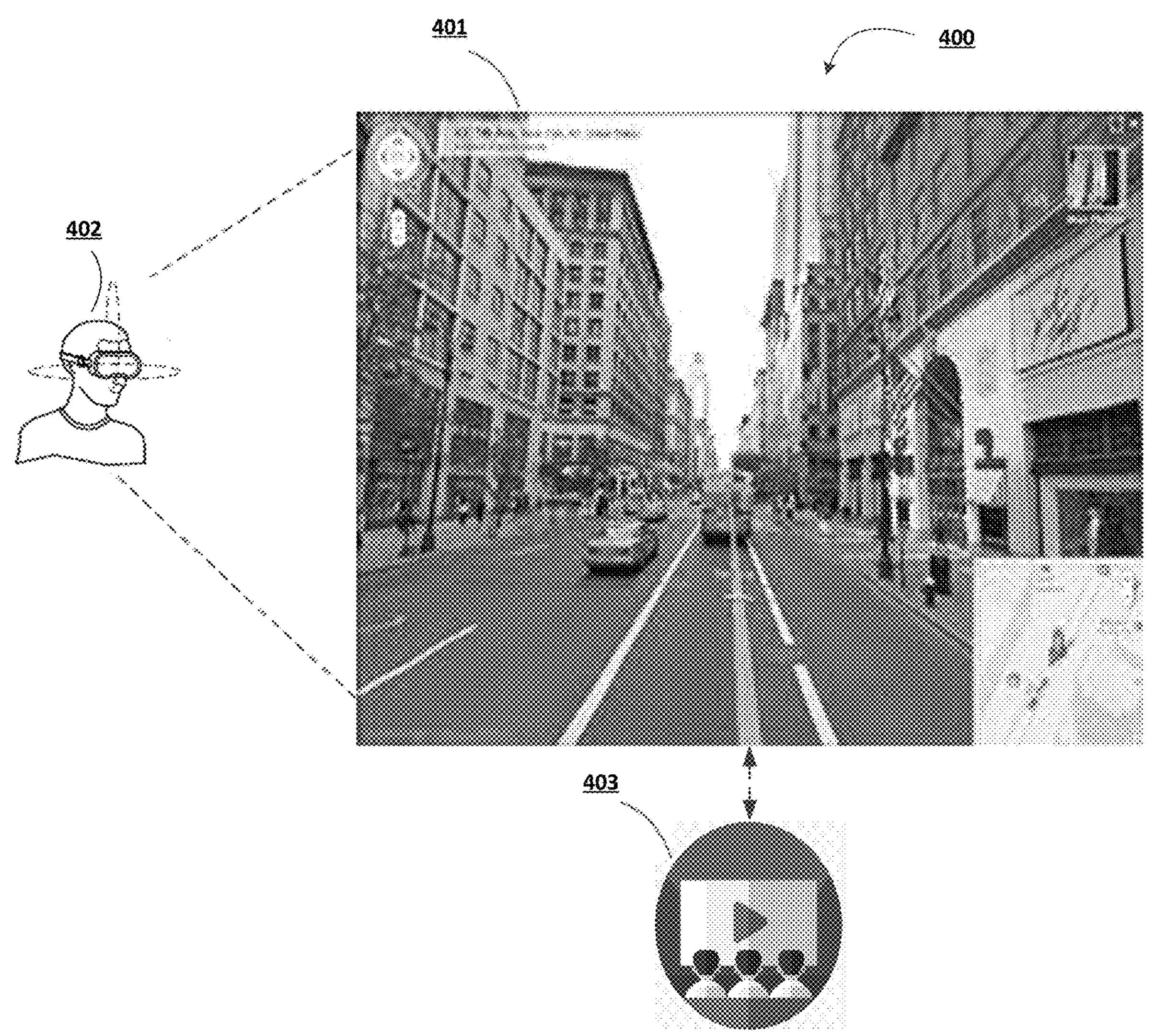
Figure 5:
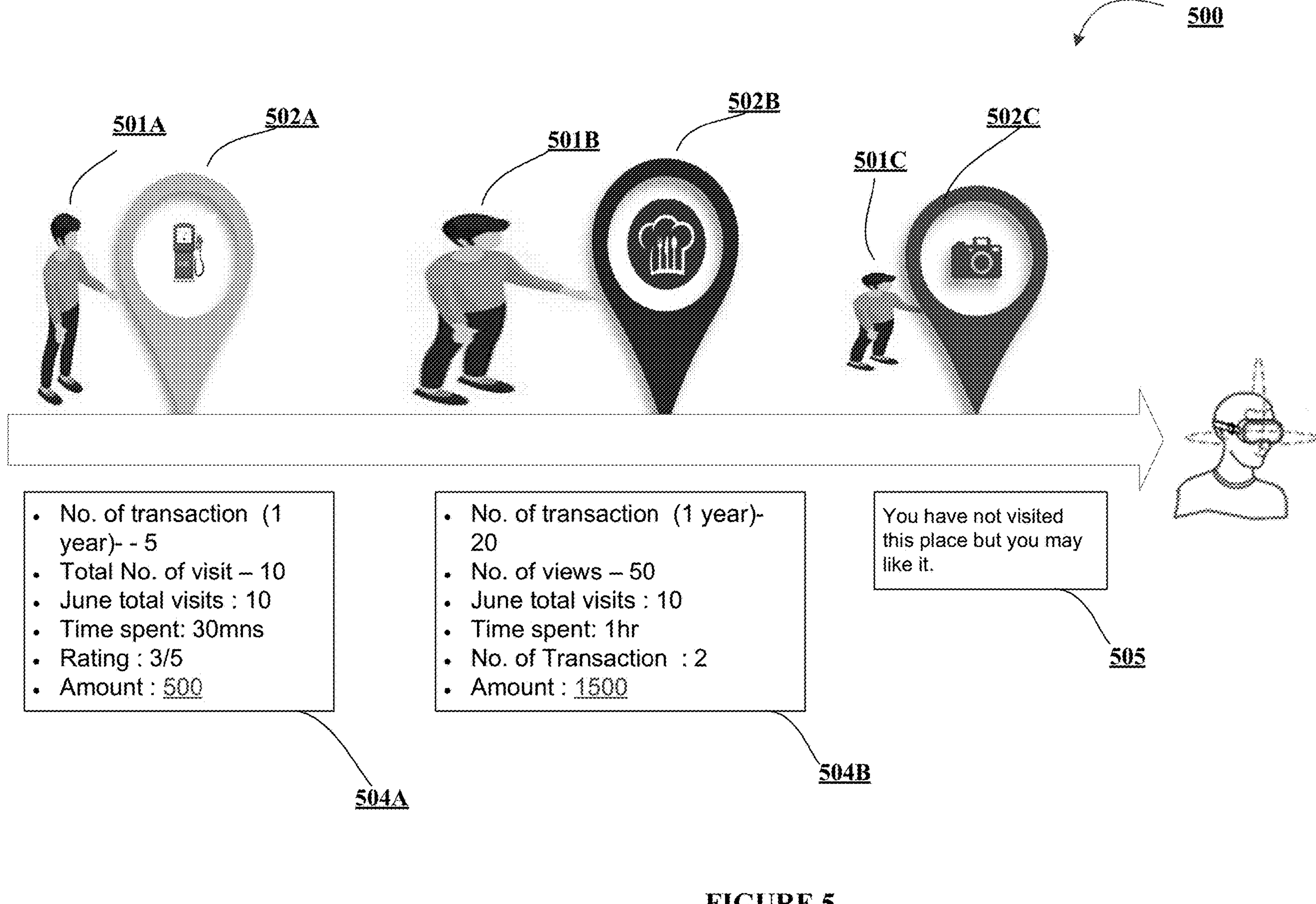

Having thus described embodiments of the invention in general terms, reference will now be made the accompanying drawings, wherein:

FIGS. 1A-1C illustrates technical components of an exemplary distributed computing environment for generating an interactive 3D environment using spatial computing to generate historical digital components, in accordance with an embodiment of the disclosure;

FIG. 2 illustrates an exemplary artificial intelligence (AI) engine subsystem architecture, in accordance with an embodiment of the disclosure;

FIG. 3 illustrates a process flow for generating an interactive 3D environment using spatial computing to generate historical digital components, in accordance with an embodiment of the disclosure;

FIG. 4 illustrates an exemplary resource transmission movie and virtual computing environment, in accordance with an embodiment of the disclosure; and FIG. 5 illustrates exemplary virtual computing environment avatars, in accordance with an embodiment of the disclosure.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term “a” and/or “an” shall mean “one or more,” even though the phrase “one or more” is also used herein. Furthermore, when it is said herein that something is “based on” something else, it may be based on one or more other things as well. In other words, unless expressly indicated otherwise, as used herein “based on” means “based at least in part on” or “based at least partially on.” Like numbers refer to like elements throughout.

As used herein, an “entity” may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a “user” may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a “user interface” may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an “engine” may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, “authentication credentials” may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that “operatively coupled,” as used herein, means that the components may be formed integrally with each other, or may be formed separately and coupled together. Furthermore, “operatively coupled” means that the components may be formed directly to each other, or to each other with one or more components located between the components that are operatively coupled together. Furthermore, “operatively coupled” may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this invention, a resource is typically stored in a resource repository-a storage location where one or more resources are organized, stored and retrieved electronically using a computing device.

As used herein, a "resource transfer," "resource transmission," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transmission," "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

In today's world, where visual data and digital multimedia has taken over the presentation of information to users across the world, there exists a great need to present non-uniform data in a clear, concise, and easy-to-use manner, whereby a user can quickly and easily determine whether the data presented is accurate and true. This problem is especially exacerbated when a user has difficulties remembering real-world locations that the user may have visited which is associated with certain data that needs to be presented and validated by the user. Such is true where the real-world events that need to be validated are found in statements and represent previous resource transmissions (e.g., such as real world financial statements and their associated transactions), whereby a user may need to validate the transmissions but may have difficulty doing so due to the time that has passed, the many locations the user has visited, and/or the like. Thus, there exists a need for a system that can efficiently, accurately, and dynamically generate and present a 3D environment to a user to generate historical digital components that can mimic real-world historical events.

The disclosure provides herein a system that leverages spatial computing to overlay a virtual world environment and virtual world components onto a real world view (such as through a virtual reality (VR) headset and/or the like, where a user may wear the VR headset as they move through the real world), whereby the digital components are associated with past resource transmissions (e.g., past financial transactions, other such data transmissions, and/or the like) at particular real world locations (such as brick and mortar locations). Further, the disclosure provides for a generative movie transformer which leverages an AI model, an auto avatar generator, and cloud services to generate a virtual movie for the user based on the historical resource transmissions that have occurred (such as the historical resource transactions in a financial statement). By way of example, the system is configured to allow for a user of a VR headset to view their past resource transmissions as a virtual reality movie so that the user can view their resource transmission patterns. In some embodiments, the resource transmission patterns may dynamically cause the user's virtual environment avatar to change its physical characteristics based on location (e.g., the avatar may increase in size for a location where the user has had greater resource transmissions).

Accordingly, the present disclosure provides for identifying at least one user account, wherein the at least one user account is associated with at least one resource account; identifying at least one resource transmission associated with the at least one resource account, wherein the at least one resource transmission is associated with at least one geolocation coordinate or at least one entity identifier; and generating a virtual computing environment based on the at least one resource transmission and at least one of the at least one geolocation coordinate or the at least one entity identifier. The disclosure further provides for generating a virtual computing environment avatar based on the user account, the at least one resource transmission and at least one of the at least one geolocation coordinate or the at least one entity identifier; and generating a resource transmission movie (e.g., that may be in sequence with respect to the time a resource transmission occurred) in the virtual computing environment, wherein the resource transmission movie comprises at least one virtual computing environment component (e.g., indicating the resource transmission amount, date, number of visits, and/or the like) based on the at least one resource transmission.

What is more, the present invention provides a technical solution to a technical problem. As described herein, the technical problem includes the determining and validating historical events using an virtual electronic environment. The technical solution presented herein allows for a system, method, and/or apparatus configured to generate a virtual computing environment and resource transmission movie comprising virtual components indicating real world events. In particular, the disclosure provided herein is an improvement over existing solutions to the determination and validation of historical events, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for implementing AI to generate a time-sensitive notifications related to configuration of GUIs 100, in accordance with an embodiment of the invention. As shown in FIG. 1A, the distributed computing environment 100 contemplated herein may include a system 130 (i.e., an system configured for generating an interactive 3D environment using spatial computing to generate historical digital components), an end-point device(s) 140 (e.g. such as virtual reality headset(s), augmented reality headsets, and/or the like), and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as “HS Interface”) is coupled to memory 104, input/output (I/O) device 116 (e.g., through a graphics processor or accelerator), and to high-speed expansion ports 111 (shown as “HS Port”), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary artificial intelligence (AI) engine subsystem architecture 200, in accordance with an embodiment of the disclosure. The artificial intelligence subsystem 200 may include a data acquisition engine 202, data ingestion engine 210, data pre-processing engine 216, AI engine tuning engine 222, and inference engine 236.

The data acquisition engine 202 may identify various internal and/or external data sources to generate, test, and/or integrate new features for training the artificial intelligence engine 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In artificial intelligence, the quality of data and the useful information that can be derived therefrom directly affects the ability of the artificial intelligence engine 224 to learn. The data pre-processing engine 216 may implement advanced integration and processing steps needed to prepare the data for artificial intelligence execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of artificial intelligence algorithm being used, this training data 218 may require further enrichment. For example, in supervised learning, the training data is enriched using one or more meaningful and informative labels to provide context so a artificial intelligence engine can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The AI tuning engine 222 may be used to train an artificial intelligence engine 224 using the training data 218 to make predictions or decisions without explicitly being programmed to do so. The artificial intelligence engine 224 represents what was learned by the selected artificial intelligence algorithm 220 and represents the rules, numbers, and any other algorithm-specific data structures required for classification. Selecting the right artificial intelligence algorithm may depend on a number of different factors, such as the problem statement and the kind of output needed, type and size of the data, the available computational time, number of features and observations in the data, and/or the like. Artificial intelligence algorithms may refer to programs (math and logic) that are configured to self-adjust and perform better as they are exposed to more data. To this extent, artificial intelligence algorithms are capable of adjusting their own parameters, given feedback on previous performance in making prediction about a dataset.

The artificial intelligence algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable artificial intelligence engine type. Each of these types of artificial intelligence algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the artificial intelligence engine, the AI tuning engine 222 may repeatedly execute cycles of experimentation 226, testing 228, and tuning 230 to optimize the performance of the artificial intelligence algorithm 220 and refine the results in preparation for deployment of those results for consumption or decision making. To this end, the AI tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the engine is the measurement used to determine which set of hyperparameters is best at identifying relationships and patterns between variables in a dataset based on the input, or training data 218. A fully trained artificial intelligence engine 232 is one whose hyperparameters are tuned and engine accuracy maximized.

The trained artificial intelligence engine 232, similar to any other software application output, can be persisted to storage, file, memory, or application, or looped back into the processing component to be reprocessed. More often, the trained artificial intelligence engine 232 is deployed into an existing production environment to make practical business decisions based on live data 234. To this end, the artificial intelligence subsystem 200 uses the inference engine 236 to make such decisions. The type of decision-making may depend upon the type of artificial intelligence algorithm used. For example, artificial intelligence engines trained using supervised learning algorithms may be used to structure computations in terms of categorized outputs (e.g., C_1, C_2 . . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, artificial intelligence engines trained using unsupervised learning algorithms may be used to group (e.g., C_1, C_2 . . . . C_n 238) live data 234 based on how similar they are to one another to solve exploratory challenges where little is known about the data, provide a description or label (e.g., C_1, C_2 . . . . C_n 238) to live data 234, such as in classification, and/or the like. These categorized outputs, groups (clusters), or labels are then presented to the user input system 130. In still other cases, artificial intelligence engines that perform regression techniques may use live data 234 to predict or forecast continuous outcomes.

It will be understood that the embodiment of the artificial intelligence subsystem 200 illustrated in FIG. 2 is exemplary and that other embodiments may vary. As another example, in some embodiments, the artificial intelligence subsystem 200 may include more, fewer, or different components.

FIG. 3 illustrates a process flow 300 for generating an interactive 3D environment using spatial computing to generate historical digital components, in accordance with an embodiment of the disclosure. In some embodiments, a system (e.g., similar to one or more of the systems described herein with respect to FIGS. 1A-1C) may perform one or more of the steps of process flow 300. For example, a system (e.g., the system 130 described herein with respect to FIG. 1A-1C) may perform the steps of process 300. In some embodiments, an artificial intelligence engine (e.g., such as the AI engine shown in FIG. 2) may perform some or all of the steps described in process flow 300.

As shown in block 302, the process flow 300 may include the step of identifying at least one user account, wherein the at least one user account is associated with at least one resource account. In some embodiments, the user account may be identified by identifying a resource transmission report that should be used to generate resource transmission movie (which will be described in further detail below), by identifying a user account from a database, by identifying a user account from the user associated with user account opting into the service provided by the system (e.g., generating a resource transmission movie), and/or the like. In some embodiments, the user account may be identified based on a resource transmission period occurring (e.g., every two weeks and/or every month, a resource transmission movie for the user account should be generated with the resource transmissions that occurring during that last resource transmission period).

Additionally, and based on the identification of the user account, at least one resource account associated with the user account may be identified. In this manner, and similar to the description provided above, a resource account may comprise data regarding the resource transmissions that have occurred from and/or to the at least one resource account. For example, and each time a merchant transaction occurs by the user account, that user account may track the merchant transaction based on what resource account it comes from and/or goes to, and may track the underlying data of the resource transmission (e.g., a geolocation coordinate for the merchant, an entity identifier for the merchant, the resource transmission amount, the timestamp the resource transmission was initiated, the timestamp the resource transmission was completed, and/or the like).

As shown in block 304, the process flow 300 may include the step of identifying at least one resource transmission associated with the at least one resource account, wherein the at least one resource transmission is associated with at least one geolocation coordinate and/or at least one entity identifier. In some embodiments, and for example, the resource transmission(s) may be identified based on parsing data in a resource account, parsing data in a resource transmission report, parsing data in a resource account based on a resource transmission period (which is described in further detail below), and/or the like. In some embodiments, the at least one resource transmission identified may be associated with at least one geolocation coordinate and/or entity identifier (e.g., which may be used to identify the merchant where the resource transmission occurred and/or was initiated). For instance, at least one geolocation coordinate may be associated with each resource transmission identified, whereby one geolocation coordinate may be shared with a plurality of resource transmission (such as where a user of the user account visited the same geolocation and/or entity multiple times). In some embodiments, the geolocation coordinate(s) and/or entity identifier(s) may be used to identify the location of the resource transmission's origination, such as a brick and mortar location, like a merchant's store, a restaurant, and/or the like. In some embodiments, the resource transmission(s) may be associated with at least one entity identifier, whereby the entity identifier may be generated by the system itself, by the entity itself (e.g., by the merchant and may comprise a store locator identifier such as a numeric identifier and alphabetic identifier, and/or the like, which may be used to identify individual locations from a chain of merchants), by a client of the system, and/or the like. As used herein, the entity identifier refers to a unique string of alphanumeric characters used to uniquely identify the entity and the location of the entity from other entities.

In some embodiments, the resource transmission is identified from a resource transmission database, whereby the at least one resource transmission is organized by a user account identifier (e.g., within the database). In this manner, the resource transmission database may be organized by user account identifiers and each of the associated resource transmissions for each user account may be organized in one column, one row, and/or one table based on the user account identifier, such that the resource transmissions may be collected accurately and efficiently from the resource transmission database. Such a resource transmission database may comprise a record of all the resource transmissions, which may be organized based timestamps of the resource transmission being completed and/or initiated, and may be organized and sectioned off based on timestamps and ranges of times (resource transmission period), based on resource transmission reports (e.g., financial statements which may be generated based on the resource transmission periods), and/or the like.

In some embodiments, the resource transmissions identified and/or used may be based on a resource transmission period (e.g., the last two weeks, the last month, certain billing period, and/or the like). In some embodiments, such a resource transmission period may be based on a client's determination of the resource transmission period (e.g., the period for resource transmission reports such as financial statement reports, which may comprise a bi-weekly period, a month period, and/or the like). In some embodiments, the resource transmission period may be based on the amount of resource transmissions and associated data, such that the generated resource transmission movie is not too long (e.g., only a certain number of resource transmissions and only a certain number of different geolocation coordinates and/or entity identifiers may be used to generate the resource transmission movie, such that the resource transmission movie does not exceed a predefined time (e.g., ten minutes, fifteen minutes, thirty minutes, and/or the like). In some embodiments, the resource transmission period may be determined by the system itself (e.g., based on the number of resource transmissions), the length of the movie that will be created based on the number of resource transmissions, based on the locations of the resource transmissions (e.g., only the resource transmissions associated with the same city, county, state, and/or the like), and/or the like. In some embodiments, a different movie may be generated based on the locations of the resource transmissions, where each movie may be generated for each city, county, state, and/or the like, even where the resource transmissions in different locations are sequential in time.

As shown in block 306, the process flow 300 may include the step of generating a virtual computing environment based on at the at least one resource transmission and at least one of the at least one geolocation coordinate and/or the at least one entity identifier. As used herein, the term virtual computing environment refers to a virtual reality environment which may be shown in a virtual reality headset (VR headset), an augmented reality headset (AR headset), a spatial computing device, and/or the like. The virtual reality environment may comprise a virtual computing environment that is overlayed over a real-world environment (such as a real-world view through the goggles of a spatial computing device, the lens of a VR headset, an AR headset, and/or the like), such that virtual environment component(s) are shown over the real-world view.

In some embodiments, the real-world view may be copied and displayed in the virtual environment along with the virtual environment components overlayed on the copied real-world view. In this manner, a viewer using the virtual reality headset would be unable or unlikely to differentiate the real-world environment shown in the virtual reality headset from the actual real-world view if the viewer were physically at the location of the real-world view (e.g., actually at a merchant location associated with the resource transmission).

In some embodiments, the geolocation coordinate(s) and/or entity identifier(s) from the resource transmission data is what determines the virtual computing environment and its associated views. In this manner, the system may be configured to render the virtual computing environment to mirror the real-world view of the geolocation coordinate and/or entity identifier such that the viewer can view the digital rendering of the merchant location where the user previously shopped.

In some embodiments, the virtual computing environment is generated by a spatial computing component. Such a spatial computing component may comprise an Internet of Things (IoT) component or device, ambient computing or device, augmented reality, virtual reality, artificial intelligence, and/or physical controls. As used herein, the spatial computing component is configured to incorporate real-world experiences, views, objects, and/or the like into an augmented reality, mixed reality or virtual reality environment, such that the real-world experiences, views, objects, and/or the like are referenced in the augmented reality, mixed reality or virtual reality environment. In this manner, the user of the system which uses the spatial computing component can interact with the digital content of the virtual reality environment, which may comprise digital renderings of the views, objects, and/or the like of the real-world environment.

As shown in block 308, the process flow 300 may include the step of generating a virtual computing environment avatar based on the user account, the at least one resource transmission and at least one of the at least one geolocation coordinate and/or the at least one entity identifier. Such a virtual computing environment avatar may be generated in the virtual computing environment as a digital rendering of the user associated with the user account. In this manner, the virtual computing environment avatar may appear similar to the user. In some embodiments, however, the user of the user account may generate the virtual computing environment avatar with whatever characteristics they may choose, such that the virtual computing environment avatar appears as the user intends. For example, the user of the user account may input at least one avatar parameter(s) (e.g., the appearance of the avatar may be based on inputs received from the user account after the user of the user account has selected the parameters, such as the hair color of the avatar, the outfit of the avatar, the shoes of the avatar, and/or the like).

In some embodiments, the virtual computing environment avatar may dynamically change based on the at least one resource transmission for each of the at least one geolocation coordinate. For example, and in some embodiments, the virtual computing environment avatar may be based on at least one resource transmission, such that based on the at least one resource transmission the avatar's appearance and/or metadata may change. For instance, and as the virtual computing environment avatar "moves" between virtual geolocations and/or between virtual entities associated with the at least one geolocation and/or the entity identifier associated with the resource transmission(s), the avatar's appearance may change based on the resource transmission(s) that occurred at each merchant location (e.g., the greater the resource transmissions, the larger the virtual computing environment avatar will appear).

In some embodiments, the dynamic change(s) may be based on just one resource transmission and/or a plurality of resource transmissions for the geolocation coordinate and/or entity identifier (e.g., the virtual computing environment avatar may get larger the greater number of resource transmissions and/or the greater combination of resource transmissions, the clothing of the virtual computing environment avatar may change, the features of the virtual computing environment avatar may change, and/or the like).

Such a dynamic change may additionally, and/or alternatively, comprise other metadata regarding the avatar such as the pixelation of the avatar as it appears in the virtual computing environment (e.g., the greater the resource transmissions, the greater pixels and more clear the image of the virtual computing environment avatar), the facial expressions of the virtual computing avatar may dynamically change (the facial expression may appear happier for at locations with greater resource transmissions, or sadder with fewer resource transmissions), and/or the like. As used herein, the phrase "greater resource transmissions" is understood to comprise the instances of the greater number of individual resource transmissions collected for each geolocation coordinate and/or entity identifier, and/or the greater the overall combination of resource transmissions collected for each geolocation coordinate and/or entity identifier (e.g., an overall resource transmission amount over the resource transmission period). Similarly, the phrase "fewer resource transmissions" is understood to comprise the instances where the number of individual resource transmissions collected for each geolocation coordinate and/or entity identifier which may be low in number or value, and/or the overall combination of resource transmissions collected for each geolocation coordinate and/or entity identifier which may be low in number or value.

In some embodiments, the virtual computing environment avatar dynamically changes comprises a dynamic change to a size of the virtual computing environment avatar and/or a clothing component of the virtual computing environment avatar. For example, and in some such embodiments, the size of the avatar may change dynamically (e.g., get bigger) based on the number of resource transmissions that have occurred at the entity/geolocation, and/or based on the total amount of resource transmissions, and/or the like. In some embodiments, the clothing may additionally and/or alternatively change as well in much the same way (e.g., the color of the clothing on the avatar may change based on the amount paid, the number of individual transmissions, and/or the like). Such changes to the avatar may occur dynamically as the avatar moves through the virtual computing environment to different geolocations/entities. Such an example is described in further detail below with respect to FIG. 5.

As shown in block 310, the process flow 300 may include the step of generating a resource transmission movie in the virtual computing environment, wherein the resource transmission movie comprises at least one virtual computing environment component based on the at least one resource transmission. As used herein, a resource transmission movie as used herein refers to a plurality of frames, whereby each frame is sequentially ordered to tell a story to the viewer, such as a story regarding the resource transmission that were identified in block 302. Such a resource transmission movie may be shown using spatial computing and within a virtual computing environment, such that the resource transmission movie is interactive. Additionally, and/or alternatively, the resource transmission movie may be interacted with by accepting a user input from the user of the virtual computing environment, such as but not limited to user inputs regarding the resource transmissions themselves and whether they should be accepted or rejected, and/or the like.

In some embodiments, the resource transmission movie is generated by a movie transformer engine. For example, such a movie transformer engine may comprise an AI engine (like that shown and described with respect to FIG. 2) that uses generative artificial intelligence to convert the data of the resource transmissions identified in block 302 to the resource transmission movie. Further, and by using the movie transformer engine, the resource transmission movie can create a 360 degree view of the virtual computing environment within the resource transmission movie so the user can interact with the entire virtual computing environment as the resource transmission movie progresses. In some embodiments, the user viewing the resource transmission movie may pause or halt the resource transmission movie and interact with the environment within the virtual computing environment surrounding the virtual geolocation and/or the virtual entity within the resource transmission movie. Such a pause or halt may be detected based on a user input received from a user device (such as a VR headset, AR headset, and/or the like) and transmitted to the system.

Further and in some embodiments, the movie transformer AI engine may be configured to dynamically change the virtual computing environment avatar based on resource transmission(s) identified and the geolocation coordinate and/or the entity identifier. Similar to the description provided above, the movie transformer AI engine may dynamically change the height and/or appearance of the virtual computing environment avatar as the resource transmission movie progresses between virtual geolocations and/or virtual entities.

In some embodiments, the movie transformer AI engine may cause the virtual computing environment avatar to appear as if the virtual computing environment avatar is walking in the virtual computing environment as the resource transmission movie progresses and/or as the user interacts with the virtual computing environment.

In some embodiments, the system may comprise a cloud service component, whereby the cloud service component is configured to generate a virtual computing environment map associated with the identified resource transmissions from block 302. In this manner, the cloud service component may generate a virtual computing environment map that comprises virtual components similar to the view a user would see if they were actually walking through a real-world map of their resource transmissions. Such an exemplary virtual computing environment map is shown and described in further detail below with respect to FIG. 4.

In some embodiments, the resource transmission movie is generated by the movie transformer AI engine, and wherein the movie transformer AI engine comprises a large video map model (LVMM). As used herein, the large video map model (LVMM) comprises a machine learning model and/or AI engine whereby at least one of the machine learning model and/or the AI engine are trained to generate embedded images for each frame of the resource transmission movie based on the data of the resource transmissions for each user account. Such embedded images may be further configured by the LVMM as the "best image" to showcase the view of the real-world environment in the resource transmission movie. As used herein, the term "best image" for purposes of the resource transmission movie may mean at least one of and/or a combination of a most clear view of the real-world environment structure (e.g., such as the most clear view of the front of a real-world environment structure, such as a merchant's storefront including their logo and/or the like), the most uninterrupted view of the real-world structure (e.g., such that the view of the merchant's storefront is uninterrupted by other structures, cars, garbage trucks, and/or the like), a view comprising the greatest number of pixels allowed for the resource transmission movie showcasing the real-world structure in the resource transmission movie, and/or the like.

In some embodiments, the resource transmission movie may comprise the "best positions" for viewing. For instance, and in some embodiments, the LVMM may be configured to determine the "best position" for the virtual computing environment avatar to "stand" to view the digital renderings of the real-world environment without the user's view being interrupted, in order to see the digital renderings as clear as possible (e.g., see the digital rendering of a store front as clear as possible), and/or the like.

In some embodiments, the LVMM is pre-trained on a plurality of videos, a plurality of images, a plurality of visual effects, a plurality of geographical coordinates, and a plurality of images or videos associated with each geographical coordinate of the plurality of geographical coordinates. For instance, and in some embodiments, the LVMM may be pre-trained on data regarding previous resource transmission movies (i.e., historical resource transmission movies), including but not limited to the images used showcasing the real-world structures (e.g., the images used to showcase brick-and-mortar locations), the historical resource transmissions used to generate the historical resource transmission movies, visual effects used in the historical resource transmission movies (e.g., the visual effects as the virtual computing environment avatar progresses through the resource transmission movie), the map coordinates associated with the geolocation identifier(s) and/or entity identifier(s) of the historical resource transmissions and how those are used to generate the historical resource transmission movies frame-by-frame, images and/or videos collected to showcase each geolocation identifier(s) and/or entity identifier(s) and the images and/or videos used to generate the historical resource transmission movie. In this manner, and by way of example, the LVMM may be trained using historical data and historical examples in the historical resource transmission movies to generate the current resource transmission movies.

In some embodiments, such an LVMM may be pre-trained based on historical resource transmissions, historical resource transmission movies, historical embedded images used in the historical resource transmission movies, and/or the like. In some embodiments, the LVMM may additionally and/or alternatively be trained with data regarding historical resource transmissions and the associated virtual computing environment avatar that may dynamically change based on those historical resource transmissions and associated geolocation identifiers and/or entity identifiers. In this manner, the LVMM may additionally and/or alternatively be configured to generate the virtual computing environment avatar within the resource transmission move and change the characteristics of the virtual computing avatar as the resource transmission movie progresses between the virtual geolocation and/or virtual entities associated with the resource transmissions showcased in the resource transmission movie.

In some embodiments, the LVMM may additionally be trained by a feedback loop, such that a user (such as a user associated with the user account) may input their feedback for how the resource transmission movie is generated (e.g., its format, its views, its images, its avatar(s), and/or the like). Such feedback may be used to train the LVMM in real-time and/or near real-time. Such feedback may additionally be used to train the LVMM for the particular user account, but also—in some embodiments—for all the users of the system as general feedback.

In some embodiments, the LVMM consolidates a plurality of related images into at least one frame associated with the at least one geolocation coordinate, and where a plurality of frames is merged to generate a resource transmission movie. For example, and in some embodiments, the LVMM may consolidate, merge, and/or combine a plurality of related images into at least one frame of the plurality of frames used to generate the resource transmission movie(s). In this manner, the LVMM may take a plurality of images (such as from a search engine) associated with at least one geolocation coordinate and/or entity identifier, and may combine some or all of the images into at least one frame showcasing at least one view associated with the geolocation coordinate and/or the entity identifier (e.g., a merchant's location) to generate the resource transmission movie. Such a frame may be used to generate the virtual computing environment that may be interacted with by the user using their virtual computing environment avatar, such that each of frames generated by the plurality of related images may be used to generate the virtual computing environment showcasing the real-world environment in the digital world as accurately as possible.

In some embodiments, the resource transmission movie comprises at least one of a current resource transmission suggestion component overlayed in the virtual computing environment associated with the at least one geolocation coordinate or the entity identifier. For instance, and in some embodiments, the resource transmission movie may additionally comprise virtual computing environment components called current resource transmission suggestion component(s) that are overlayed in the virtual computing environment to show the user viewing the virtual computing environment (such as when the user progresses through the resource transmission movie) suggestions of where to visit in the real-world which match the locations shown in the virtual computing environment. For instance, such a current resource transmission suggestion component may comprise data showing overall user satisfaction with a merchant's location in the virtual computing environment based on real-world customer satisfaction, overall resource transmissions that have occurred at the merchant's location, whether any real-world offers are about to occur at the merchant's location and what they may comprise, and/or the like.

In some embodiments, the resource transformer movie comprises an over layment of an at least one digital component over a real-world environment, wherein the at least one digital component comprises the virtual computing environment. For example, and in some embodiments, the resource transmission movie may comprise an over layment of the at least one digital component as the user is walking through the real-world environment. As used herein, the digital component may comprise the resource transmission movie itself, such that as the user is walking through the real-world environment that corresponds to the geolocation coordinate(s) and/or entity identifier(s) associated with the resource transmissions, the resource transmission movie may play over the VR headset the user is wearing, the AR headset the user is wearing, and/or the like.

In some embodiments, the resource transmission movie comprises an overlayment of an at least one digital component over a real-world environment, wherein the at least one digital component comprises the virtual computing environment. For example, and in some embodiments, the resource transmission movie may comprise an overlayment of the at least one digital component as the user is walking through the real-world environment. As used herein, the digital component may comprise the resource transmission movie itself, such that as the user is walking through the real-world environment that corresponds to the geolocation coordinate(s) and/or entity identifier(s) associated with the resource transmissions, the resource transmission movie may play over the VR headset the user is wearing, the AR headset the user is wearing, and/or the like.

FIG. 4 illustrates an exemplary resource transmission movie and virtual computing environment 400, in accordance with an embodiment of the disclosure. In some embodiments, a system (e.g., similar to one or more of the systems described herein with respect to FIGS. 1A-1C) may perform one or more of the steps for generating the resource transmission movie and virtual computing environment 400. For example, a [ ] system (e.g., the system 130 described herein with respect to FIG. 1A-1C) may perform the steps for generating the resource transmission movie and virtual computing environment 400. In some embodiments, an artificial intelligence engine (e.g., such as the AI engine shown in FIG. 2) may perform some or all of the steps for generating the resource transmission movie and virtual computing environment 400.

As shown in exemplary resource transmission movie 403 and virtual computing environment 401, a virtual computing environment showcasing real-world structures (e.g., real-world buildings, buses, cars, and/or the like) may be shown as digital components in a virtual computing environment similar a real-world environment. Additionally, and as a user moves through the real world and/or the virtual computing environment using a VR headset (much like the one shown as VR headset 402), the view in the virtual computing environment and/or resource transmission movie 403 as the user moves through the real-world environment and/or the virtual computing environment.

As shown here, the virtual computing environment 401 may be based on a virtual computing environment map that is meant to mirror and/or parallel a real-world map, such that as the user moves through the virtual computing environment 401, the images shown to the user match what the user would see in the real-world (e.g., based on a real-world map that also mirrors the virtual computing environment map).

FIG. 5 illustrates exemplary virtual computing environment avatars 700, in accordance with an embodiment of the disclosure. In some embodiments, a system (e.g., similar to one or more of the systems described herein with respect to FIGS. 1A-1C) may perform one or more of the steps for generating virtual computing environment avatars 700. For example, a system (e.g., the system 130 described herein with respect to FIG. 1A-1C) may perform the steps for generating virtual computing environment avatars 700. In some embodiments, an artificial intelligence engine (e.g., such as the AI engine shown in FIG. 2) may perform some or all of the steps for generating virtual computing environment avatars 700.

For example, and as shown herein, the system may comprise and/or generate at least one virtual computing environment avatar (e.g., virtual computing environment avatar 501A, 501B, 501C, and/or the like), and each of these avatars may comprise similar characteristics (e.g., facial features, hair color, clothing, and/or the like), but other characteristics (e.g., height, width, and/or the like) may change dynamically as the virtual computing environment avatar moves through the virtual computing environment and/or resource transmission movie. For instance, and as the virtual computing environment avatar (e.g., 501A, 501B, 501C) moves through the resource transmission movie, the size of the virtual computing environment avatar may change dynamically as the viewer is viewing the resource transmission movie (e.g., using a VR headset).

In some embodiments, and as the virtual computing environment avatar moves through the resource transmission movie, the digital components (e.g., 502A, 502B, 502C, and/or the like) may show the user viewing the resource transmission movie certain identifiers for what each merchant may sell (e.g., a gas icon to show a merchant sells petrol, a chef hat icon to show the merchant is a food vendor, a camera icon to show the merchant is a point of interest, and/or the like). In some embodiments, and as the resource transmission movie progresses, a digital component (e.g., 504A, 504B, 505, and/or the like) may indicate the number of resource transmissions (e.g., total and/or in a resource transmission period), the total resource transmissions at each geolocation and/or entity, the total number of visits, the number of visits during the resource transmission period, the rating of the merchant (e.g., by the specific user and/or generally), the time spent at the merchant, and/or the like.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 18/504,851 | SYSTEM FOR DETECTION OF UNAUTHORIZED COMPUTER CODE USING AN ARTIFICIAL INTELLIGENCE-BASED ANALYZER | Nov. 8, 2023 |

What is claimed is:

1. A system for generating an interactive three-dimensional (3D) environment using spatial computing to generate historical digital components, the system comprising:

a memory device with computer-readable program code stored thereon;

at least one processing device, wherein executing the computer-readable program code is configured to cause the at least one processing device to perform the following operations:

identify at least one user account, wherein the at least one user account is associated with at least one resource account;

identify a set of resource transmissions associated with the at least one resource account, wherein the set of resource transmissions are associated with at least one geolocation coordinate or at least one entity identifier and wherein the set of resource transmissions correspond to a plurality of real-world historical resource transmissions from the at least one resource account;

generate a virtual computing environment based on the set of resource transmissions and at least one of the at least one geolocation coordinate or the at least one entity identifier;

generate a virtual computing environment avatar based on the user account, the set of resource transmissions and at least one of the at least one geolocation coordinate or the at least one entity identifier; and generate a resource transmission movie in the virtual computing environment, wherein the resource transmission movie comprises at least one virtual computing environment component corresponding to the plurality of real-world historical resource transmissions, wherein the resource transmission movie replays the plurality of real-world historical resource transmissions in time order as the user traverses a spatial path corresponding to the at least one geolocation coordinate or the at least one entity identifier.

2. The system of claim 1, wherein the virtual computing environment avatar dynamically changes based on at least one resource transmission for each of the at least one geolocation coordinate.

3. The system of claim 2, wherein the virtual computing environment avatar dynamically changes comprises a dynamic change to a size of the virtual computing environment avatar or a clothing component of the virtual computing environment avatar.

4. The system of claim 1, wherein at least one resource transmission is from a resource transmission database, and wherein the at least one resource transmission is organized by a user account identifier.

5. The system of claim 1, wherein the resource transmission movie is generated by a movie transformer artificial intelligence (AI) engine, and wherein the movie transformer AI engine comprises a large video map model (LVMM).

6. The system of claim 5, wherein the LVMM is pre-trained on a first plurality of videos, a first plurality of images, a plurality of visual effects, a plurality of geographical coordinates, and a second plurality of images or videos associated with each geographical coordinate of the plurality of geographical coordinates.

7. The system of claim 5, wherein the LVMM consolidates a plurality of related images into at least one frame associated with the at least one geolocation coordinate, and where a plurality of frames is merged to generate the resource transmission movie.

8. The system of claim 1, wherein the resource transmission movie comprises at least one of a current resource transmission suggestion component overlaid in the virtual computing environment associated with the at least one geolocation coordinate or the entity identifier.

9. The system of claim 1, wherein the resource transformer movie comprises an overlayment of an at least one digital component over a real-world environment, wherein the at least one digital component comprises the virtual computing environment.

10. A computer program product for generating an interactive three-dimensional (3D) environment using spatial computing to generate historical digital components, wherein the computer program product comprises at least one non-transitory computer-readable medium having computer-readable program code portions embodied therein, the computer-readable program code portions which when executed by a processing device are configured to cause the processor to perform the following operations:

identify at least one user account, wherein the at least one user account is associated with at least one resource account;

identify a set of resource transmissions associated with the at least one resource account, wherein the set of resource transmissions are associated with at least one geolocation coordinate or at least one entity identifier and wherein the set of resource transmissions correspond to a plurality of real-world historical resource transmissions from the at least one resource account;

generate a virtual computing environment based on the set of resource transmissions and at least one of the at least one geolocation coordinate or the at least one entity identifier;

generate a virtual computing environment avatar based on the user account, the set of resource transmissions and at least one of the at least one geolocation coordinate or the at least one entity identifier; and generate a resource transmission movie in the virtual computing environment, wherein the resource transmission movie comprises at least one virtual computing environment component corresponding to the plurality of real-world historical resource transmissions, wherein the resource transmission movie replays the plurality of real-world historical resource transmissions in time order as the user traverses a spatial path corresponding to the at least one geolocation coordinate or the at least one entity identifier.

11. The computer program product of claim 10, wherein the virtual computing environment avatar dynamically changes based on at least one resource transmission for each of the at least one geolocation coordinate.

12. The computer program product of claim 11, wherein the virtual computing environment avatar dynamically changes comprises a dynamic change to a size of the virtual computing environment avatar or a clothing component of the virtual computing environment avatar.

13. The computer program product of claim 10, wherein the resource transmission movie is generated by a movie transformer artificial intelligence (AI) engine, and wherein the movie transformer AI engine comprises a large video map model (LVMM).

14. The computer program product of claim 13, wherein the LVMM is pre-trained on a first plurality of videos, a first plurality of images, a plurality of visual effects, a plurality of geographical coordinates, and a second plurality of images or videos associated with each geographical coordinate of the plurality of geographical coordinates.

15. The computer program product of claim 13, wherein the LVMM consolidates a plurality of related images into at least one frame associated with the at least one geolocation coordinate, and where a plurality of frames is merged to generate the resource transmission movie.

16. A computer implemented method for generating an interactive three-dimensional (3D) environment using spatial computing to generate historical digital components, the computer implemented method comprising:

identifying at least one user account, wherein the at least one user account is associated with at least one resource account;

identifying a set of resource transmission associated with the at least one resource account, wherein the set of resource transmissions are associated with at least one geolocation coordinate or at least one entity identifier and wherein the set of resource transmissions correspond to a plurality of real-world historical resource transmissions from the at least one resource account;

generating a virtual computing environment based on the set of resource transmissions and at least one of the at least one geolocation coordinate or the at least one entity identifier;

generating a virtual computing environment avatar based on the user account, the set of resource transmissions and at least one of the at least one geolocation coordinate or the at least one entity identifier; and generating a resource transmission movie in the virtual computing environment, wherein the resource transmission movie comprises at least one virtual computing environment component corresponding to the plurality of real-world historical resource transmissions, wherein the resource transmission movie replays the plurality of real-world historical resource transmissions in time order as the user traverses a spatial path corresponding to the at least one geolocation coordinate or the at least one entity identifier.

17. The computer implemented method of claim 16, wherein the virtual computing environment avatar dynamically changes based on at least one resource transmission for each of the at least one geolocation coordinate.

18. The computer implemented method of claim 17, wherein the virtual computing environment avatar dynamically changes comprises a dynamic change to a size of the virtual computing environment avatar or a clothing component of the virtual computing environment avatar.

19. The computer implemented method of claim 16, wherein the resource transmission movie is generated by a movie transformer artificial intelligence (AI) engine, and wherein the movie transformer AI engine comprises a large video map model (LVMM).

20. The computer implemented method of claim 19, wherein the LVMM is pre-trained on a first plurality of videos, a first plurality of images, a plurality of visual effects, a plurality of geographical coordinates, and a second plurality of images or videos associated with each geographical coordinate of the plurality of geographical coordinates.

* * * * *